US006902658B2

(12) United States Patent
Talin et al.

(10) Patent No.: US 6,902,658 B2
(45) Date of Patent: Jun. 7, 2005

(54) FED CATHODE STRUCTURE USING ELECTROPHORETIC DEPOSITION AND METHOD OF FABRICATION

(75) Inventors: Albert Alec Talin, Scottsdale, AZ (US); Kenneth Andrew Dean, Phoenix, AZ (US); Shawn M. O'Rourke, Tempe, AZ (US); Bernard F. Coll, Fountain Hills, AZ (US); Matthew Stainer, Goleta, CA (US); Ravichandran Subrahmanyan, Lake Oswego, OR (US)

(73) Assignee: Motorola, Inc., Schaumburg, IL (US)

( * ) Notice: Subject to any disclaimer, the term of this patent is extended or adjusted under 35 U.S.C. 154(b) by 198 days.

(21) Appl. No.: 10/024,164

(22) Filed: Dec. 18, 2001

(65) Prior Publication Data

US 2003/0111946 A1 Jun. 19, 2003

(51) Int. Cl.[7] ............................................... C25D 13/12
(52) U.S. Cl. ....................... 204/484; 204/485; 204/486; 204/490; 204/491
(58) Field of Search ................................ 204/484, 485, 204/486, 490, 491

(56) References Cited

U.S. PATENT DOCUMENTS

| 5,019,003 | A |   | 5/1991  | Chason            |         |
| 5,773,921 | A |   | 6/1998  | Keesmann et al.   |         |
| 5,872,422 | A |   | 2/1999  | Xu et al.         |         |
| 5,977,697 | A | * | 11/1999 | Jin et al.        | 313/310 |
| 6,342,755 | B1 | * | 1/2002  | Russ et al.       | 313/310 |
| 6,462,467 | B1 | * | 10/2002 | Russ              | 313/495 |
| 6,514,113 | B1 |   | 2/2003  | Lee et al.        |         |
| 6,616,497 | B1 | * | 9/2003  | Choi et al.       | 445/24  |

FOREIGN PATENT DOCUMENTS

| EP | 0957503 A2    |   | 11/1999 |
| JP | 2001-312955 A | * | 11/2001 |
| WO | WO 01/11647 A1|   | 2/2001  |

OTHER PUBLICATIONS

Xu et al., "A method for fabricating large–area, patterned, carbon nanotube field emitters," Applied Physics Letters, vol. 74, No. 17, Apr. 26, 1999, pp. 2549–2551.

Fan et al., "Self–oriented regular arrays of carbon nanotubes and their field emission properties," Science, vol. 283, Jan. 22, 1999, pp. 512–514.

Suh et al, "Highly ordered two–dimensional carbon nanotube arrays," Applied Physics Letters, vol. 75, No. 14, Oct. 4, 1999, pp. 2047–2049.

Hernadi et al. "Catalytic synthesis of carbon nanotubes using zeolite support," Zeolites 17, 1996, pp. 416–423.

Murakami et al., "Field emission from well–aligned, patterned, carbon nanotube emitters," Applied Physics Letters, vol. 76, No. 13, Mar. 27, 2000, pp. 1776–1778.

(Continued)

Primary Examiner—Kishor Mayekar

(57) ABSTRACT

A method of fabricating a field emission device cathode using electrophoretic deposition of carbon nanotubes in which a separate step of depositing a binder material onto a substrate, is performed prior to carbon nanotube particle deposition. First, a binder layer is deposited on a substrate from a solution containing a binder material. The substrate having the binder material deposited thereon is then transferred into a carbon nanotube suspension bath allowing for coating of the carbon nanotube particles onto the substrate. Thermal processing of the coating transforms the binder layer properties which provides for the adhesion of the carbon nanotube particles to the binder material.

15 Claims, 2 Drawing Sheets

OTHER PUBLICATIONS

Ma et al., "Polymerized carbon nanobells and their field–emission properties," Applied Physics Letters, vol. 75, No. 20, Nov. 15, 1999, pp. 3105–3107.

Li et al, "Highly–ordered carbon nanotube arrays for electronics applications," Applied Physics Letters, vol. 75, No. 3, Jul. 19, 1999, pp. 367–369.

Terrones et al., "Controlled production of aligned–nanotube bundles," Nature, vol. 388, Jul. 3, 1997, pp. 52–55.

Xu et al., "Controlling growth and field emission property of aligned carbon nanotubes on porous silicon substrates," Applied Physics Letters, vol. 75, No. 4, Jul. 26, 1999, pp. 481–483.

Tsai et al., "Bias–enchanced nucleation and growth of the aligned carbon nanotubes with open ends under microwave plasma synthesis," Applied Physics Letters, vol. 24, No. 23, Jun. 7, 1999. pp. 3462–3464.

Kind et al., "Patterned films of nanotubes using microcontact printing of catalysts," Advanced Materials, 11, No. 15, 1999, pp. 1285–1289.

Nilsson et al., "Scanning field emission from patterned carbon nanotube films." Applied Physics Letters, vol. 76. No. 15, Apr. 10, 2000, pp. 2071–2073, Kuttel et al, "Electron field emission from phase pure nanotube films grown in a methane/hydrogen plasma," Applied Physics Letters, vol. 73, No. 15, Oct. 12, 1998, pp. 2113–2115.

Ren et al., "Synthesis of large arrays of well–aligned carbon nanotubes on glass," Science, vol. 282 Nov. 6, 1998, pp. 1105–1107.

Ren et al. "Growth of a single freestanding multiwall carbon nanotube on each nanonickel dot," Applied Physics Letters, vol. 75, No. 8 Aug. 23, 1999, pp. 1086–1088.

Pan et al., "Very long carbon nanotubes," Nature, vol. 394, Aug. 13, 1998, pp. 631–632.

Zhang et al., "A flat panel display device fabricated by using carbon nanotubes cathode," IEEE, 2001, pp. 193–194.

Zhong et al., "Large–scale well aligned carbon nitride nanotube films: Low temperature growth and electron field emission," Journal of Applied Physics, vol. 89, No. 11. Jun. 1, 2001, pp. 5939–5943.

Kim et al., "Growth and field emission of carbon nanotubes on electroplated Ni catalyst coated on glass substrates," Journal of Applied Physics, vol. 90, Sep. 1, 2001, pp.2591–2594.

Gulyaev et al., "Field emitter arrays on nanotube carbon structure films," J. Vac.Sci. Technol. B 13(2), Mar/Apr 1995, pp. 435–436.

Chernozatonskii, et al. "Nanotube carbon structure tips—a source of high field emission of electrons," Mat. Res.Soc. Symp. Proc., vol. 359. 1995 Materials Research Society, pp. 99–104.

Su et al., "A scalable CVD method for the synthesis of single–walled carbon nanotubes with high catalyst productivity," Chemical Physics Letters 322, (2000), pp 321–326.

Li et al. "Large–scale synthesis of aligned carbon nanotubes," Science, vol. 274, Dec. 6, 1996. pp. 1701–1703.

Cassell et al. "Large scale CVD synthesis of single–walled carbon nanotubes," J. Phys. Chem. B. 1999, 103, pp. 6484–6492.

Cassell et al, "Directed growth of free–standing single walled carbon nanotubes," J. Am. Chem. Soc. 1999, 121, pp. 7975–7976.

Cassell et al, "Combinatorial optimization of heterogeneous catalysts used in the growth of carbon nanotubes," Langmuir 2001, 17, pp. 260–264.

Li et al, "Large–scale synthesis of aligned carbon nanotubes," Science, vol. 274, Dec. 6, 1996, pp. 1701–1703.

* cited by examiner

FED CATHODE STRUCTURE USING ELECTROPHORETIC DEPOSITION AND METHOD OF FABRICATION

FIELD OF INVENTION

The present invention pertains to field emission display devices, and more particularly to a novel field emission cathode structure and method of forming the field emission cathode structure for use in a field emission display device.

BACKGROUND OF THE INVENTION

Field emission devices (FEDs) are known in the art. Such prior art devices are constructed by a variety of methods all of which yield structures with the purpose of emitting electrons from an emitter electrode. FEDs typically include an anode, a cathode, and phosphors disposed therebetween in a position corresponding to each pixel. During operation, electrons emitted by the cathode, are accelerated by an electric field created between the cathode and the anode, and impinge upon the phosphors, thereby exciting the phosphors to emit light, and thus display an image.

It is known in the prior art to form cathode structures utilizing carbon nanotube (CNT) deposition. Typically, during cathode fabrication, a binder material and CNT particles are deposited simultaneously. One means of deposition is to mix the CNT particles with the binder into a paste and deposit the paste. The binder is necessary in electrophoretic deposition (EPD) to glue the CNT particles to the substrate. As stated, generally, the deposition of the binder is performed concomitantly with the particle deposition. However, a stable colloidal suspension, which is desirable for uniform films, is not always obtainable with the binder material and the powder together in the same solution. The binder material, or binder salt, imposes a positive charge onto the suspended particles. In the case of CNT particles, this results in a failed suspension, with CNT particles clumping together. EPD from such a solution leads to highly non-uniform deposits with high density of agglomerates present on the film surface. Non-uniform EPD coatings lead to non-uniformities in the spatial distribution of field emission current and to defects in the cathodes.

Accordingly, there exists a need for an improved cathode structure and method for fabricating the cathode structure using electrophoretic deposition techniques that will result in a uniform EPD coating.

It is an object of the present invention to provide for a FED cathode and method of fabricating a FED cathode using electrophoretic deposition of carbon nanotubes.

It is another object of the present invention to provide for a FED cathode and method of fabricating an FED cathode wherein a uniform EPD coating is achieved.

It is yet another object of the present invention to provide for an EPD coating that does not require post-deposition activation to obtain a high density of emission sites.

SUMMARY OF THE INVENTION

The above problems and others are at least partially solved and the above purposes and others are realized in an FED cathode structure and method of fabricating an FED cathode structure using electrophoretic deposition of carbon nanotubes in which a separate step of a depositing a binder material on a substrate, is performed prior to carbon nanotube particle deposition. The binder is necessary in EPD to glue the particles to the substrate. First, a binder layer is formed on a substrate, when the substrate is deposited in a solution such as $Mg(NO_3)_2$/IPA. The substrate having the binder material formed thereon is then transferred into a carbon nanotube (CNT) suspension bath allowing for coating of the CNT particles onto the binder layer. Thermal processing of the binder layer and CNT particle coating transforms the $Mg(OH)_2$ into MgO. In one particular embodiment a plurality of micro-island structures are formed. The MgO serves as a ballast layer for uniform emission since it is not a good conductor. Additionally, the thermal processing embeds the CNT particles to the binder material. Post-deposition activation, such as mechanical polishing is not required to obtain a high density of emission sites in the presence of the MgO binder separating into micro-islands upon thermal processing, with CNTs protruding from the edges of the islands.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

Figure 1:
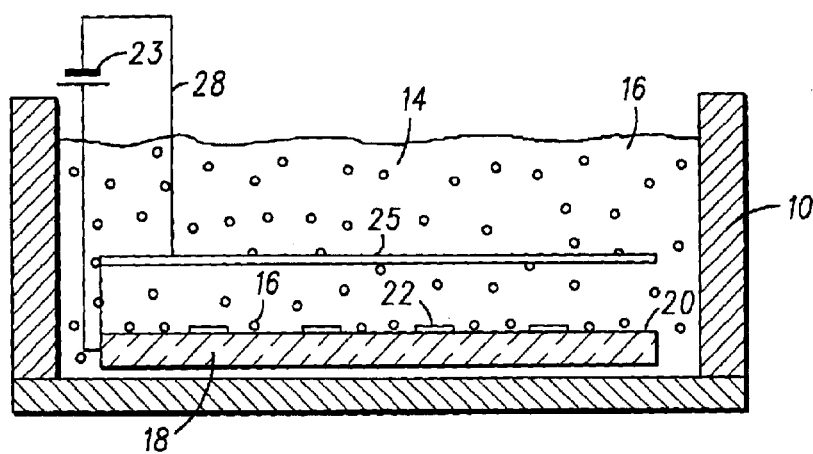
FIGS. 1–5 illustrate in simplified sectional views steps in the method of fabricating a field emission cathode structure according to the present invention and the final device structure formed according to the method of the present invention.

It will be appreciated that for simplicity and clarity of illustration, elements illustrated in the drawings have not necessarily been drawn to scale. For example, the dimensions of some of the elements are exaggerated relative to other elements for purposes of clarity. Furthermore, where considered appropriate, reference numerals have been repeated among the drawings to indicate corresponding or analogous elements.

DESCRIPTION OF THE PREFERRED EMBODIMENT

This invention describes a field emission cathode structure and a new method of fabricating the field emission cathode structure utilizing electrophoretic deposition (EPD) of particles from a suspension. A process especially suited for carbon nanotube (CNT) deposition is given as an example. The new method of fabricating the cathode structure includes the separation of the binder deposition as a separate step which is performed prior to the carbon nanotube particle deposition. The binder is necessary in EPD to glue the carbon nanotube particles to the substrate. The prior art provides for the deposition of the binder concomitantly with the particle deposition. As previously stated, a stable colloidal suspension, which is desirable for uniform films, is not always obtainable with the binder material and the powder together in the same solution. This is exemplified in the case of CNT in suspension in the presence of cations. For example, a stable suspension of CNT in isopropyl alcohol (IPA) can be formed. However, if a binder constituent such as $Mg(NO_3)_2$ is added, the suspension is destabilized leading to flocculation. EPD from such a suspension leads to highly non-uniform deposits with high density of agglomerates present on the film surface. Described herein is a method for preparing a uniform coating which includes the pre-depositing of a binder layer from a separate solution (Mg(NO$_3$)$_2$/IPA), then transferring the substrate into a bath with a CNT suspension which does not contain the binder while not allowing the binder layer to dry. Finally, the CNT particles are coated onto the substrate. Thermal processing of the coating transforms the Mg(OH)$_2$ into MgO which essentially glues the CNT particles to the substrate. The resultant cathode structure provides for a structure in which no post-deposition activation, such as mechanical polishing is required to obtain a high density of emission sites. This is because MgO binder separates into micro-islands upon thermal processing with CNTs protruding from the edges of the islands and serves as a ballast layer. It should be understood that anticipated by this disclosure is the fabrication of a binder layer as a uniform layer without the formation of micro-islands.

Figure 3:
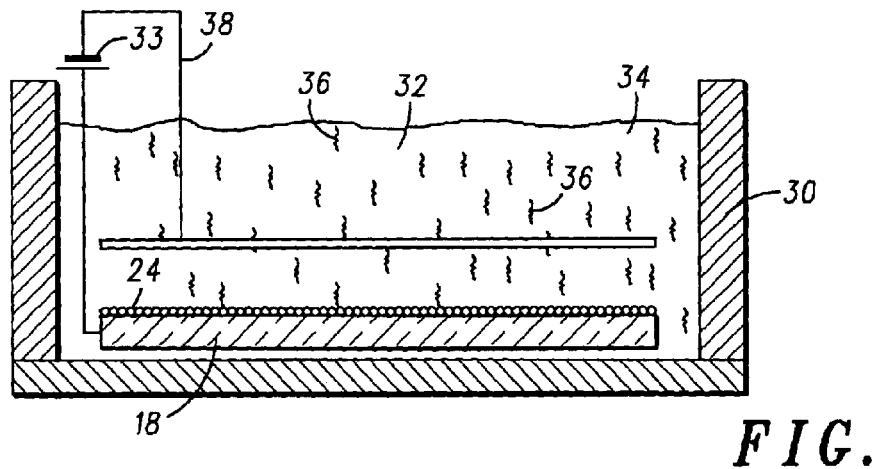
Figure 4:
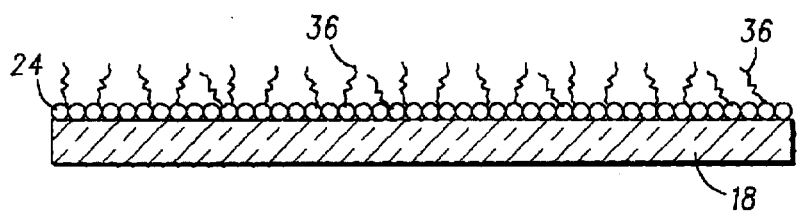
Figure 5:
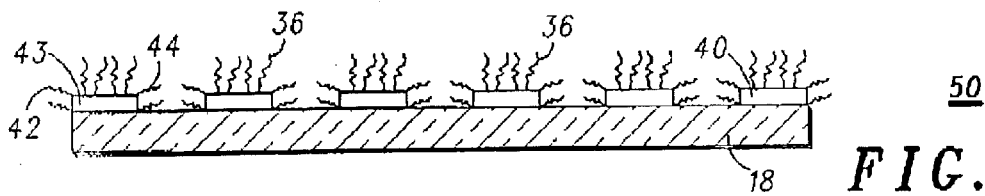

Turning now to the drawings, FIGS. 1–5 illustrate in simplified sectional views steps in the method of fabricating a field emission cathode structure according to the present invention. Additionally, illustrated in FIG. 5 is the completed field emission cathode structure fabricated according to the method of the present invention. Referring now to FIG. 1, illustrated in simplified sectional view is the first step in the process of fabricating the field emission cathode structure of the present invention. Provided is an electrobath 10, or suspension bath, having contained therein a binder solution 12, comprised of a solvent 14 and having a solute salt 16 disposed therein. Solvent 14 is disclosed in the preferred embodiment as being alcohol, water, glycerin, or a combination of alcohol and/or water and/or glycerin. Alcohols anticipated for use include ethyl alcohol, methanol, isopropyl alcohol (IPA), or the like. Solute salt 16 is dispersed within solvent 14 and is comprised of a metal nitrate salt, such as aluminum or magnesium nitrates, a sulfate salt, or the like. In a preferred embodiment, solute salt 16 is comprised of magnesium nitrate particles (Mg(NO$_3$)$_2$). Solute salt 16 is provided at a concentration level of $1 \times 10^{-2}$ to $1 \times 10^{-4}$ M. During fabrication the magnesium nitrate disassociates into magnesium ions and nitrate ions (discussed presently).

Next, provided is a substrate 18, having a surface 20. Substrate 18 is disclosed in a preferred embodiment as being formed of any standard substrate material, such as glass, plastic, or ceramic and having a plurality of metal electrodes 22 patterned on surface 20. Metal electrodes 22 are disclosed as being formed of any suitable conductive metal, such as copper (Cu), molybdenum (Mb), platinum (Pt), indium-tin-oxide (ITO), or the like.

Figure 2:
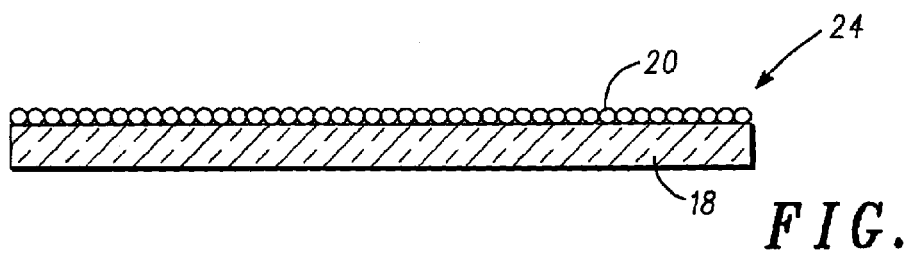

During fabrication of the cathode structure of the present invention, substrate 18 is immersed into solution 12. A voltage, or bias, 28 is applied by a power source 23 to substrate 12, thereby providing for the migration of the solute particles 16 toward the surface 20, more particularly towards metal electrodes 22, of substrate 18. As illustrated, to accomplish this migration of the solute particles 16 toward metal electrodes 22, an opposed electrode, more particularly a counter-electrode 25, is immersed in solution 12. In this particular embodiment counter electrode 25 is formed as a separate electrode, but it should be understood that is could be formed as the gate electrode on the cathode surface. Counter electrode 25 is spaced in a range of approximately 1 mm to 5 cm away from electrodes 22, and preferably approximately 1 cm. Counter electrode 25 provides for an improved field strength and a uniform electric field. In a preferred embodiment, a negative voltage 28 in a range of 1–20 volts is applied to substrate 18 for a time period in a range of 1–5 minutes, dependent upon desired thickness of the resultant layer (discussed presently). More specifically, in this particular embodiment, a negative voltage of −5v is applied to substrate 18 for 1 minute at a current of 0.25 amps. As a result, positively charged particles of the disassociated magnesium nitrate, bind to electrodes 22, thereby forming a binder layer 24 as illustrated in FIG. 2. More specifically, the application of bias 28 forms Mg(OH)$_2$ on the surface of substrate 18 by the reaction of Mg(NO$_3$)$^+$+ 2OH$^-$→Mg(OH)$_2$(s)+NO$_3^-$. It is anticipated by this disclosure that binder layer 24 in the alternative can be formed of any metal oxide, such as aluminum oxide, yttrium oxide, lanthanum oxide, or the like. It is additionally anticipated by this disclosure that an additional conductive metal oxide, such as iron oxide, tin oxide, or the like can be added to binder layer 24 to further increase the conductivity of binder layer 24.

Referring now to FIG. 3, illustrated in a simplified sectional view, is the next step in the fabrication of the cathode structure according to the present invention. Once binder layer 24 is formed on substrate 18, substrate 18 is immersed in a colloidal solution 32 of an emitting structure in a solvent. In this particular embodiment, provided is an electrobath 30, or suspension bath, having contained therein, a solution 32 comprised of a plurality of carbon nanotubes 36 suspended in IPA 34. Dependent upon desired outcome, an optional dispersion agent (not shown) may be added to solution 32 to aid in the suspension of nanotubes 36 therein.

Next, a bias 38 is applied from a voltage source 33. In a preferred embodiment, a positive voltage in a range of 5–50 volts is applied to substrate 18 for a time period in a range of approximately 30 seconds to approximately 5 minutes, dependent upon desired thickness of the resultant layer (discussed presently). More specifically, in this particular embodiment, a positive bias 38 of +50 volts is applied to substrate 18 for approximately 30 seconds. The application of bias 38 provides for the migration of nanotube structures 36 toward binder layer 24.

Referring now to FIG. 4, following the application of bias 38 to substrate 18 and the resultant migration of nanotubes 36 to binder layer 24, substrate 18 is removed from suspension bath 30 and dried in air at a temperature ranging from 100–300° C. for approximately 5–20 minutes. Once dry, a second baking step in a vacuum takes place, at a temperature ranging from 350–500° C. for approximately 30–90 minutes. This thermal processing step provides for substrate 18 to form adhesion properties and provides for the formation of a plurality of micro-islands 40 (as illustrated in FIG. 5) in binder layer 24 defined by a plurality of edges 42, 43, and 44. The plurality of micro-islands 40 having carbon nanotubes 36 embedded in edges 42, 43 and 44 of micro-islands 40 and protruding from edges 42, 43, and 44. Accordingly, illustrated is a final field emission cathode structure, referenced 50, fabricated according to the present invention. It is anticipated by this disclosure an embodiment in which binder layer 24 is fabricated as a uniform layer to which the carbon nanotubes 36 are embedded without the need for the formation of micro-islands 40.

Figure 6:
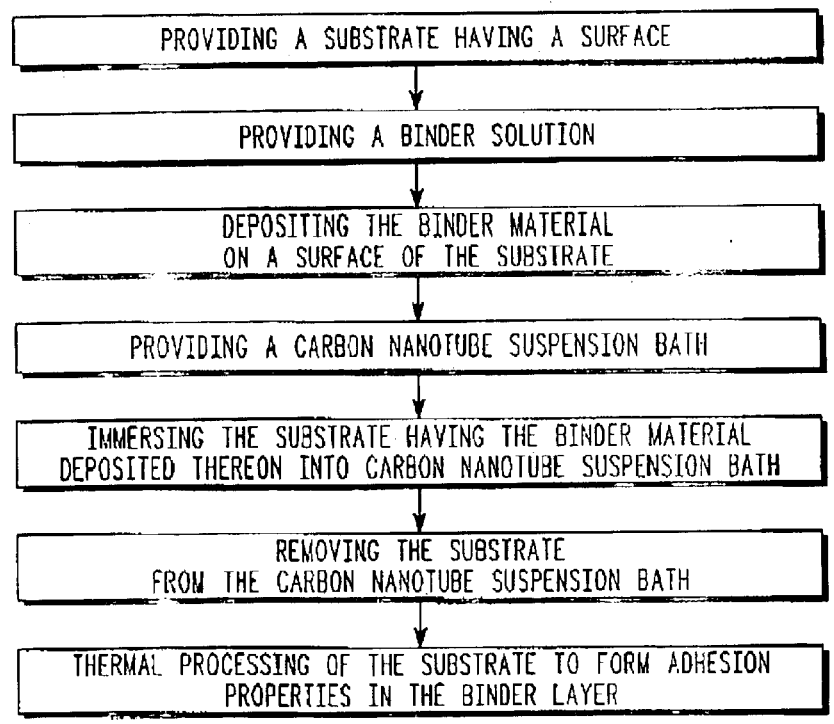
FIG. 6 is a simplified schematic diagram illustrating the method of fabricating a field emission cathode structure according to the method of the present invention.

FIG. 6 is a simplified schematic diagram illustrating the method 60 of fabricating a field emission cathode structure according to the present invention.

Field emission cathodes based on this new process were prepared starting with a conductive ceramic, such as FODEL®, (with Ag, Mo, or Cu) thick film pattern on borosilicate glass. Binder deposition was carried out in a solution of $5 \times 10^{-3}$ M Mg(NO$_3$)$_2$ in isopropyl alcohol (IPA) with −5V applied to the substrate for 1 minute at a current of 0.25 Amps. This step formed Mg(OH)$_2$ on the surface of the FODEL by reaction of $Mg(NO_3)^+ + 2OH^- \rightarrow Mg(OH)_2 (s) + NO_3^-$. The coated substrate was then transferred into a bath containing only (IPA). From the holding bath the substrate with featuring (1 mm alumina spacers and stainless steel counter electrode and clips) was transferred into a suspension bath containing a suspension of CNTs in IPA with a small concentration of DARVAN 821a dispersant (3 drops/100 mL) to enhance suspension. The deposition of CNTs was performed at +20 volts applied to the substrate for 30 seconds. Following the deposition, the substrate was dried in air at 80° C. for 15 minutes, then baked for 90 minutes in vacuum at 480° C.

Accordingly, disclosed is a field emission device cathode and method of fabricating a field emission device cathode using electrophoretic deposition. More specifically, disclosed is a method in which multiple steps are utilized to provide for the binding of carbon nanotube particles to a binder material thereby forming a field emission cathode structure having a greater emitting surface are than those previously known in the prior art. As disclosed, a separate solution containing a binder material is initially deposited on a surface of a substrate. The substrate, having the binder material deposited thereon, is subsequently immersed in a carbon nanotube suspension bath and a voltage is applied thereto to provide for the migrating of the carbon nanotubes to the binder layer. Once removed from the bath, the substrate having the binder material and carbon nanotube particles suspended thereon undergoes thermal processing to form adhesion properties in the binder layer. In one specific embodiment, the carbon nanotubes are embedded into a plurality of micro-islands formed of the binder material having portions protruding from the edges of the micro-islands.

While we have shown and described specific fabrication steps in the present invention, further modifications and improvements will occur to those skilled in the art. The present invention provides for a field emission device cathode and a method of fabricating a field emission device cathode using electrophoretic deposition in which a high yield is capable of being produced. We desire it to be understood, that this invention is not limited to the particular fabrication steps shown and we intend in the appended claims to cover all modifications that do not depart from the spirit and scope of this invention.

What is claimed is:

1. A method of fabricating a cathode using electrophoretic deposition comprising the steps of:
   providing a substrate;
   providing a solvent, having a solute comprised of dissolved metal ions disposed therein, the solvent and solute forming a binder solution;
   immersing the substrate into the binder solution;
   applying a voltage to the immersed substrate, the application of the voltage providing for in situ formation of a binder material as a product of the reaction of the binder solution to the applied voltage and electrophoretic deposition of the binder material to the immersed substrate, thereby forming a layer of binder material on the immersed substrate;
   removing the substrate having the layer of binder material formed thereon from the binder solution;
   providing a suspension bath consisting of a colloidal solution of an alcohol and a plurality of emitting structures;
   immersing the substrate having the layer of binder material formed thereon, into the suspension bath;
   removing the substrate from the suspension bath; and
   thermal processing of the removed substrate to form adhesion properties.

2. A method of fabricating a cathode using electrophoretic deposition as claimed in claim 1 wherein the step of providing a substrate, includes providing a substrate having a plurality of patterned metal electrodes formed thereon a surface of the substrate.

3. A method of fabricating a cathode using electrophoretic deposition as claimed in claim 1 wherein the providing a solvent, includes the step of providing at least one of an alcohol, a water, or a glycerin solvent.

4. A method of fabricating a cathode electrophoretic deposition as claimed in claim 3 wherein the binder material is magnesium hydroxide ($Mg(OH)_2$).

5. A method of fabricating a cathode using electrophoretic deposition as claimed in claim 3 wherein in the step of providing a suspension bath the emitting structures are carbon nanotubes and the alcohol is isopropyl alcohol (IPA).

6. A method of fabricating a cathode electrophoretic deposition as claimed in claim 5 wherein the step of immersing the substrate having the binder material formed thereon, into the colloidal solution of an alcohol and a plurality of emitting structures further includes the step of applying a bias to the suspension bath, thereby providing for the migration and binding of the emitting structures to the layer of binder material.

7. A method of fabricating a cathode electrophoretic deposition as claimed in claim 1 wherein the step of thermal processing the substrate to form adhesion properties, further includes the formation of a plurality of micro-islands in the binder layer defined by a plurality of edges, the plurality of micro-islands having the plurality of emitting structures embedded in the micro-islands and protruding from the edges.

8. A method of fabricating a cathode using electrophoretic deposition comprising the steps of:
   providing a substrate having a plurality of metal electrodes formed thereon;
   providing a binder solution including a solvent and a solute salt comprised of dissolved metal ions;
   immersing the substrate into the binder solution;
   applying a voltage to the immersed substrate thereby forming in situ a binder material as a product of the binder solution and the applied voltage;
   electrophoretically depositing the binder material formed in situ on a surface of the immersed substrate, thereby forming a layer of binder material on the plurality of metal electrodes formed thereon the substrate;
   providing a suspension bath consisting of a colloidal solution of alcohol and a plurality of carbon nanotubes;
   immersing the substrate having the layer of binder material formed thereon, into the suspension bath consisting of a colloidal solution of an alcohol and a plurality of carbon nanotubes;
   removing the substrate from the suspension bath; and
   thermal processing of the substrate to form adhesion properties in the binder layer and form micro-islands defined by a plurality of edges, and having carbon nanotubes protruding from the edges of the micro-islands.

9. A method of fabricating a cathode wing electrophoretic deposition as claimed in claim 8 wherein the step of providing a solvent, includes the step of providing at least one of an alcohol, a water, or a glycerin.

10. A method of fabricating a cathode using electrophoretic deposition as claimed in claim 9 wherein the alcohol is one of methanol, ethanol, or isopropyl alcohol (IPA).

11. A method of fabricating a cathode using electrophoretic deposition as claimed in claim 9 wherein the binder material is magnesium hydroxide ($Mg(OH)_2$).

12. A method of fabricating a cathode using electrophoretic deposition as claimed in claim 8 wherein the step of providing a suspension bath includes the step of providing a colloidal solution of carbon nanotubes suspended in an alcohol solvent.

13. A method of fabricating a cathode using electrophoretic deposition as claimed in claim 8 wherein the step of immersing the substrate having the binder material formed thereon, into the suspension bath further includes the step of applying a bias to the suspension bath, thereby providing for the migration and binding of the carbon nanotubes to the layer of binder material.

14. A method of fabricating a cathode using electrophoretic deposition comprising the steps of:

providing a substrate;

providing a solvent, having a solute comprised of dissolved metal ions disposed therein, the solvent and solute forming a binder solution;

immersing the substrate into the binder solution;

applying a voltage to the immersed substrate, the application of the voltage providing for in situ formation of a binder material as a product of the reaction of the bind solution to the applied voltage and electrophoretic deposition of the binder material to the immersed substrate, thereby forming a layer of binder material on the immersed substrate;

removing the substrate having the layer of binder material formed thereon from the binder solution;

providing a suspension bath consisting of a colloidal solution of an alcohol, a dispersion agent, and a plurality of emitting structures;

immersing the substrate having the layer of binder material formed thereon, into the suspension bath;

removing the substrate from the suspension bath; and thermal processing of the removed substrate to form adhesion properties.

15. A method of fabricating a cathode using electrophoretic deposition comprising the steps of:

providing a substrate having a plurality of metal electrodes formed thereon;

providing a binder solution including a solvent and a solute salt comprised of dissolved metal ions;

immersing the substrate into the binder solution;

applying a voltage to the immersed substrate thereby forming in situ a binder material as a product of the binder solution and the applied voltage;

electrophoretically depositing the binder material formed in situ on a surface of the immersed substrate, thereby forming a layer of binder material on the plurality of metal electrodes formed thereon the substrate;

providing a suspension bath consisting of a colloidal solution of an alcohol, a dispersion agent, and a plurality of carbon nanotubes;

immersing the substrate having the layer of binder material formed thereon, into the suspension bath consisting of a colloidal solution of an alcohol and a plurality of carbon nanotubes;

removing the substrate from the suspension bath; and thermal processing of the substrate to form adhesion properties in the binder layer and form micro-islands defined by a plurality of edges, and having carbon nanotubes protruding from the edges of the micro-islands.

* * * * *